(12) United States Patent
Han

(10) Patent No.: US 9,392,251 B2
(45) Date of Patent: Jul. 12, 2016

(54) DISPLAY APPARATUS, GLASSES APPARATUS AND METHOD FOR CONTROLLING DEPTH

(75) Inventor: Jea-hee Han, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

(21) Appl. No.: 13/615,676

(22) Filed: Sep. 14, 2012

(65) Prior Publication Data

US 2013/0169623 A1 Jul. 4, 2013

(30) Foreign Application Priority Data

Dec. 29, 2011 (KR) ........................ 10-2011-0146199
Jan. 31, 2012 (KR) ........................ 10-2012-0010092
Mar. 23, 2012 (KR) ........................ 10-2012-0030026

(51) Int. Cl.
*H04N 13/00* (2006.01)
*H04N 13/04* (2006.01)

(52) U.S. Cl.
CPC ....... *H04N 13/0022* (2013.01); *H04N 13/0438* (2013.01); *H04N 13/0434* (2013.01); *H04N 2013/0463* (2013.01); *H04N 2013/0465* (2013.01); *H04N 2213/008* (2013.01)

(58) Field of Classification Search
None
See application file for complete search history.

(56) References Cited

U.S. PATENT DOCUMENTS

| 8,537,206 | B2 | 9/2013 | Son et al. | |
|---|---|---|---|---|
| 2005/0219239 | A1* | 10/2005 | Mashitani et al. | ............ 345/419 |
| 2007/0296874 | A1 | 12/2007 | Yoshimoto et al. | |
| 2009/0267958 | A1 | 10/2009 | Bruls et al. | |
| 2010/0201790 | A1 | 8/2010 | Son et al. | |
| 2010/0302237 | A1* | 12/2010 | Aramaki | ........................ 345/419 |
| 2011/0157172 | A1 | 6/2011 | Bennett et al. | |
| 2011/0243336 | A1* | 10/2011 | Nakano | ........................... 381/17 |
| 2011/0286093 | A1 | 11/2011 | Bittner | |
| 2011/0304708 | A1 | 12/2011 | Ignatov | |

FOREIGN PATENT DOCUMENTS

| CN | 101632311 A | 1/2010 |
|---|---|---|
| CN | 101799584 A | 8/2010 |
| CN | 10201492 A | 4/2011 |
| WO | 2008/035284 A2 | 3/2008 |

OTHER PUBLICATIONS

Communication from the European Patent Office issued Dec. 20, 2013 in a counterpart European Application No. 12191664.7.
Communication dated Oct. 19, 2015, issued by the State Intellectual Property Office of the People's Republic of China in counterpart Chinese Patent Application No. 201210497418.9.

* cited by examiner

*Primary Examiner* — Said Broome
(74) *Attorney, Agent, or Firm* — Sughrue Mion, PLLC

(57) ABSTRACT

A display apparatus is provided. The display apparatus includes; a plurality of receivers which receives a plurality of contents; a signal processor which generates image frames by processing the plurality of contents; an output unit which outputs a plurality of content views by combining the image frames of each of the plurality of contents; a synchronization signal generator which generates a synchronization signal to synchronize a plurality of glass apparatuses matched to the plurality of content views; an interface unit which transmits the synchronization signal to the glass apparatus; and a controller which, when a depth control command for one of the plurality of content views is input, controls the signal processor to adjust the depth of one of the plurality of content views.

4 Claims, 22 Drawing Sheets

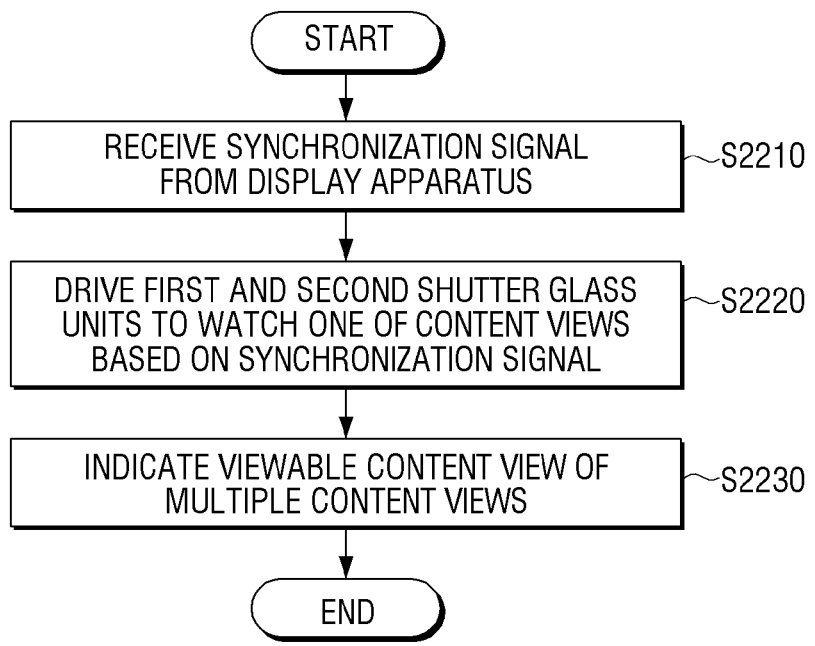

DISPLAY APPARATUS, GLASSES APPARATUS AND METHOD FOR CONTROLLING DEPTH

CROSS-REFERENCE TO RELATED APPLICATIONS

This application claims priority under 35 U.S.C. §119 (a) from Korean Patent Applications No. 10-2011-0146199 filed Dec. 29, 2011, No. 10-2012-0010092 filed Jan. 31, 2012, and No. 10-2012-0030026 filed Mar. 23, 2012 in the Korean Intellectual Property Office, the entire disclosures of which are incorporated herein by reference.

BACKGROUND

1. Field

Exemplary embodiments relate to a display apparatus, a glass apparatus, and a depth controlling method. More particularly, exemplary embodiments relate to a display apparatus for providing a plurality of content views, a glass apparatus, and a depth controlling method.

2. Description of the Related Art

In accordance with advance of digital technologies, various electronic products are developed and supplied. Particularly, display devices such as TV, mobile phone, PC, notebook PC, and PDA are widely used in many households.

As the use of the display devices is increasing, user needs for more varied functions also increase. Hence, electronic product manufacturers exert more efforts to meet those user needs, and products with totally new functions are emerging.

Recently, there have developed high needs for a technique allowing multiple users to view their intended content with the single common display device. The display device essentially displays realistic images to the viewer. For doing so, the display device should be big and as clear as possible within the field of view of the human. Nowadays, PCs and smart phones corresponding to personal display devices continually suggest solutions. However, since the personal display device is portable, there is a limit to the perfect display. By contrast, a public display device such as TV or large-scale screen can overcome the limited image transfer of the personal display device, but cannot provide the individual content to each viewer. Hence, it is necessary to provide the content for the individual among the various contents as a vivid image through the single common display device.

In this regard, efforts to develop a display apparatus for providing a plurality of contents at the same time so that a plurality of users can watch different contents are underway. Using such a display apparatus, the plurality of the users can individually select and watch their intended content using the single display apparatus. The contents displayable by the display apparatus can include broadcasting reception screens and various program execution screens. The display apparatus can process various contents. In particular, contents of great data size, such as high-resolution content or 3D content, has been recently provided.

SUMMARY

Exemplary embodiments have been provided to solve the above-mentioned and/or other problems and disadvantages and an exemplary embodiment provides a display apparatus for controlling a depth of an individual content view when a plurality of three-dimensional (3D) content views are provided, a glass apparatus, and a depth controlling method.

According to an aspect of an exemplary embodiment, a display apparatus includes a plurality of receivers for receiving a plurality of contents; a signal processor which generates image frames by processing the plurality of the contents; an output unit which outputs a plurality of content views by combining the image frames of each of the plurality of contents; a synchronization signal generator which generates a synchronization signal to synchronize a plurality of glass apparatuses matched to the plurality of content views; an interface unit which transmits the synchronization signal to at least one of the plurality of glass apparatuses; and a controller which, when a depth control command for one of the plurality of content views is input, controls the signal processor to adjust the depth of one of the plurality of content views.

The display apparatus can further include a storage unit which stores information related to a depth control state.

When the depth of one of the plurality of content views is adjusted and the adjusted one of the plurality of content views is turned on from a turn-off state, the controller may read the information related to the depth control state of the adjusted one of the plurality of content views from the storage unit before the turn-off state and control the signal processor to output the adjusted one of the plurality of content views according to the information related to the depth control state.

When the display apparatus switches from a single-view mode to a multi-view mode, the controller may read the information related to the depth control state regarding a newly turned on content view from the storage unit and control the signal processor to output the newly turned on content view according to the information related to the depth control state.

A method for controlling a depth includes generating image frames by processing the plurality of contents; outputting a plurality of content views by combining the image frames of each of the plurality of contents; generating a synchronization signal to synchronize a plurality of glass apparatuses matched to the plurality of content views; transmitting the synchronization signal to the plurality of glass apparatuses; and when a depth control command for one of the plurality of content views is input, adjusting the depth of one of the plurality of content views.

The method may further include storing information related to a depth control state.

The method may further include, when the depth of the one of the plurality of content views is adjusted and the adjusted one of the plurality of content views is turned on from a turn-off state, outputting the adjusted one of the plurality of content views according to the information related to the depth control state stored before the turn-off state.

The method may further include, when a display apparatus for outputting the content view switches from a single-view mode to a multi-view mode, outputting the newly turned on content view according to the information related to the depth control state of the newly turned on content view.

According to various exemplary embodiments, the depth of the 3D image can be controlled in the individual content view without affecting other content views.

Another aspect of an exemplary embodiment provides a display apparatus for displaying a viewable content view, a glass apparatus, and a method for controlling a depth.

According to another aspect of an exemplary embodiment, there is provided a glass apparatus for interworking with a display apparatus. The glass apparatus provides a first shutter glass unit; a second shutter glass unit; a communication interface unit which receives a synchronization signal from the display apparatus; a shutter glass driver unit which drives the first shutter glass unit and second shutter glass unit to watch one of the plurality of content views, based on the synchronization signal; an indicator unit; and a control unit which controls the indicator unit to indicate a viewable content view of the plurality of content views.

The indicator unit may include a plurality of light emitting elements of different colors corresponding to the plurality of content views, respectively, and the control unit may turn on at least one of the plurality of light emitting elements corresponding to the viewable content view among the plurality of content views.

The indicator unit may include a display unit, and the control unit may control the display unit to display information of the viewable content view among the plurality of content views.

The glass apparatus may further include an input unit for receiving a user selection signal. The control unit may select one of the plurality of content views according to the user selection signal inputted, control the shutter glass driver unit to open the first and second shutter glass units according to a display timing of the selected content view, and control the indicator unit to indicate the selected content view.

According to yet another aspect of an exemplary embodiment, there is provided a method for driving a glass apparatus which comprises first and second shutter glass units includes receiving a synchronization signal from a display apparatus; based on the synchronization signal, driving the first and second shutter glass units to watch one of a plurality of content views; and indicating a viewable content view among the plurality of content views.

The glass apparatus may include a plurality of light emitting elements of different colors corresponding to the plurality of content views, respectively, and the indicating may include turning on at least one of the plurality of light emitting elements corresponding to the viewable content view among the plurality of content views.

The glass apparatus may include a display unit, and the indicating operation may include displaying information of the viewable content view among the plurality of content views through the display unit.

The driving the first and second shutter glass units may include receiving a user selection signal; selecting one of the plurality of content views according to the user selection signal; and opening the first and second shutter glass units according to a display timing of the selected content view.

According to yet another exemplary embodiment, there is provided a display apparatus comprising: a signal processor which generates image frames by processing a received plurality of contents; an output unit which outputs a plurality of content views; a synchronization signal generator which generates a synchronization signal to synchronize a plurality of glass apparatuses matched to the plurality of content views; an interface unit which transmits the synchronization signal to at least one of the plurality of glass apparatuses; and a controller which controls the signal processor to adjust a depth of at least one of the plurality of content views.

According to yet another exemplary embodiment, there is provided a method for controlling a depth, including: generating image frames by processing a plurality of contents; outputting a plurality of content views by combining the image frames of each of the plurality of contents; generating a synchronization signal to synchronize a plurality of glass apparatuses matched to the plurality of content views; transmitting the synchronization signal to the plurality of glass apparatuses; and adjusting a depth of at least one of the plurality of content views.

BRIEF DESCRIPTION OF THE DRAWING FIGURES

These and/or other aspects of exemplary embodiments will become apparent and more readily appreciated from the following description of the exemplary embodiments, taken in conjunction with the accompanying drawings of which:

FIG. 22 is a flowchart of the method for driving the glass apparatus according to an exemplary embodiment.

DETAILED DESCRIPTION OF EXEMPLARY EMBODIMENTS

Figure 1:
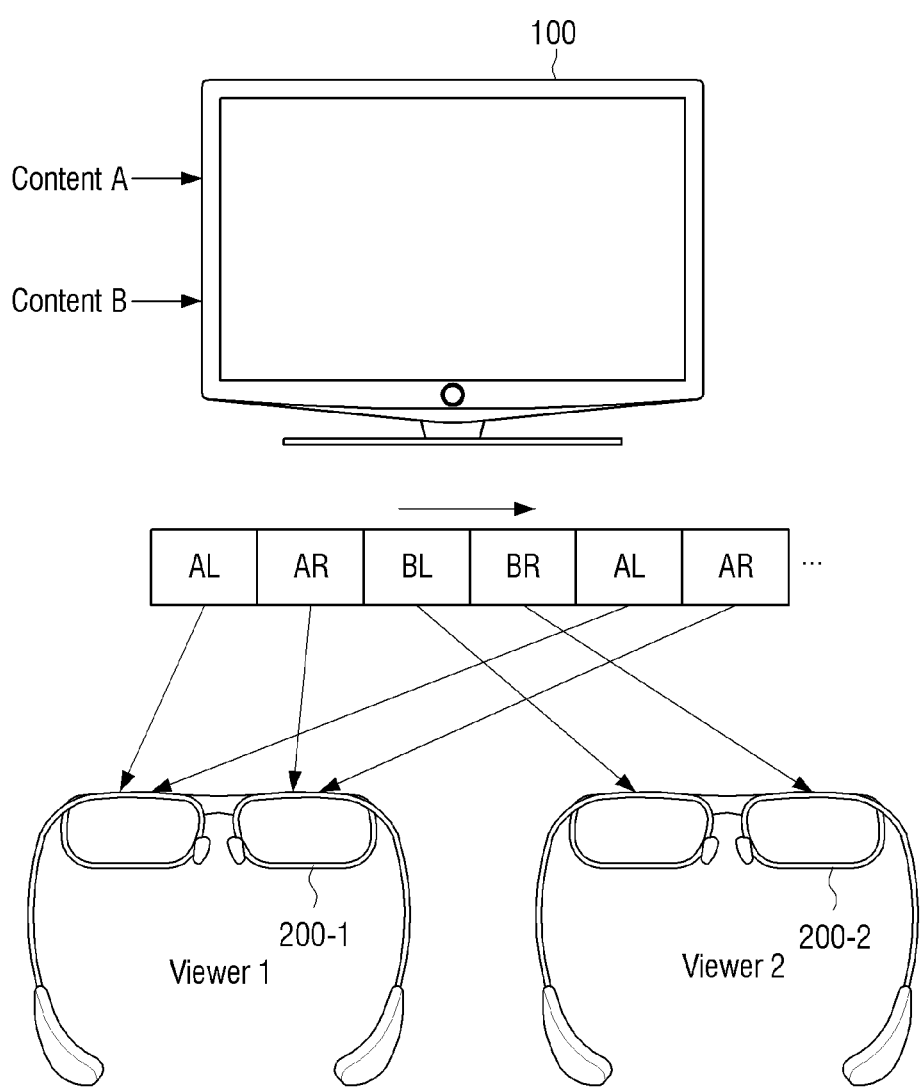
FIG. 1 is a simplified diagram of a content providing system according to an exemplary embodiment.

Reference will now be made in detail to the exemplary embodiments, examples of which are illustrated in the accompanying drawings, wherein like reference numerals refer to the like elements throughout. The exemplary embodiments are described below by referring to the figures.

Figure 2:
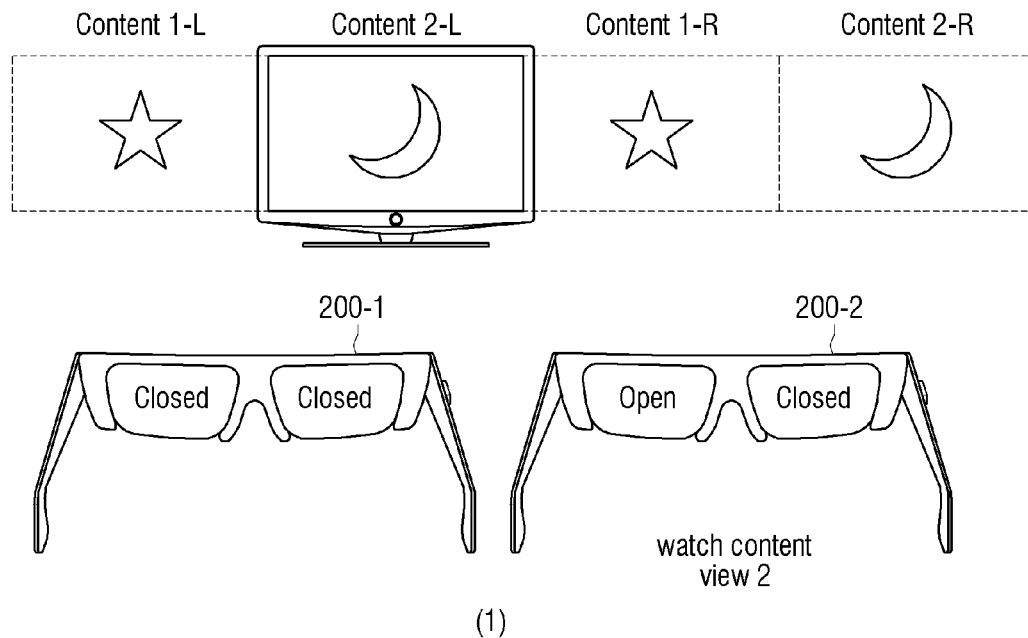
FIG. 2 is a conceptual diagram of operations of a display apparatus and a glass apparatus according to an exemplary embodiment.
Figure 2:
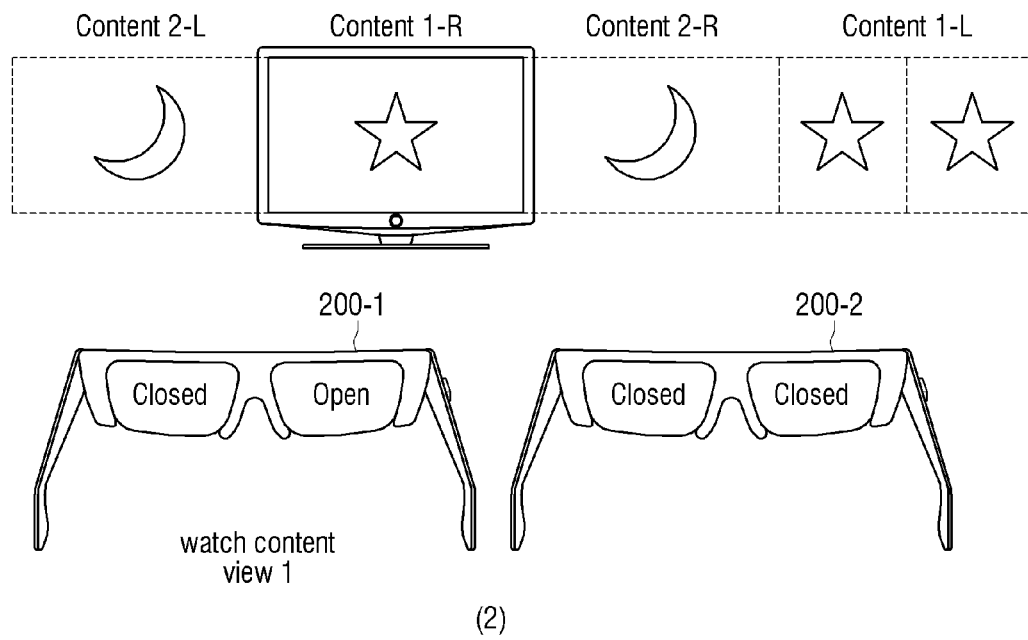
Figure 3:
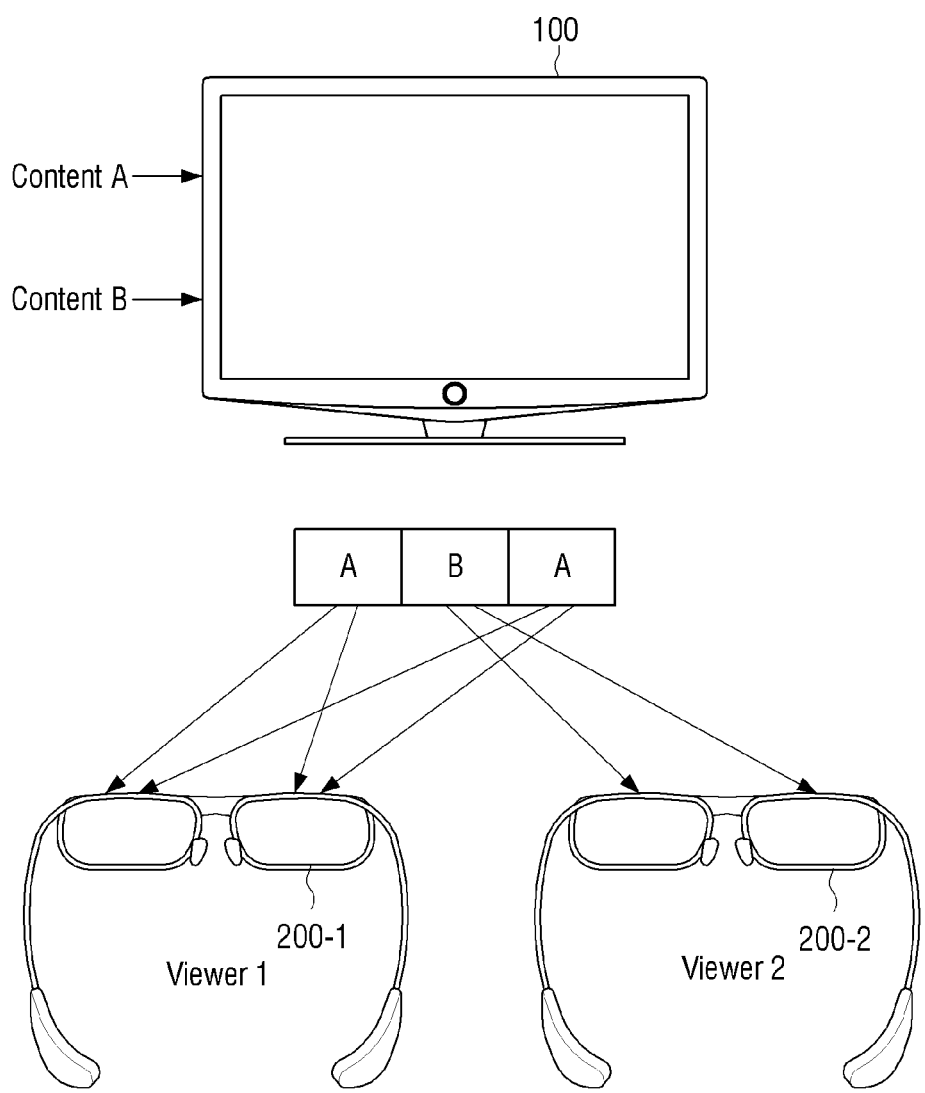
FIG. 3 is a simplified diagram of a content providing system according to an exemplary embodiment.

FIGS. 1, 2 and 3 are conceptual diagrams of a content providing system according to various exemplary embodiments.

As shown in FIGS. 1, 2 and 3, a content providing system includes a display apparatus 100 and glass apparatuses 200-1 and 200-2. The display apparatus 100 outputs a plurality of content views by combining a plurality of image frames of different contents. The glass apparatuses 200-1 and 200-2 pass only one content view (content A or content B) output from the display apparatus 100. Herein, the combination and the output of the image frames of the contents indicate the alternate output of the image frames of the different contents. That is, the image frames of the different contents are alternately output by first outputting the image frame of one content and then the image frame of other content. The content view indicates a display screen and a synchronized sound through one glass apparatus 200 synchronized with the display apparatus 100. While various contents can be viewed through the single content view, one content can be viewed only through the same content view.

FIG. 1 depicts a plurality of 2D contents according to an exemplary embodiment.

Referring to FIG. 1, the display apparatus 100 alternately displays a plurality of 2D contents A and B, generates a synchronization signal for synchronizing first and second glass apparatuses 200-1 and 200-2 corresponding to the respective contents, and sends the generated synchronization signal to the glass apparatuses 200-1 and 200-2.

According to the synchronization signal, the first glass apparatus 200-1 can open both a left shutter glass and a right shutter glass when one content A is displayed, and close both the left shutter glass and the right shutter glass when the other content B is displayed. Hence, a first viewer wearing the first glass apparatus 200-1 can view only one content A synchronized with the first glass apparatus 200-1 among the plurality of contents A and B alternately displayed. Likewise, a second viewer wearing the second glass apparatus 200-2 can view only the content B.

FIGS. 2 and 3 depict a plurality of 3D contents according to another exemplary embodiment. With a plurality of 3D contents A and B, the display apparatus 100 can alternately display the plurality of the 3D contents and alternately display a left-eye image and a right-eye image of each 3D content.

Referring first to FIG. 2, since each content includes left-eye images (contents 1-L and 2-L) and corresponding right-eye images (contents 1-R and 2-R), the left-eye image (or the right-eye image) of one content view and the left-eye image (or the right-eye image) of the other content view are alternately displayed in the end. In so doing, two glass apparatuses 200-1 and 200-2 are synchronized with the image frame of the different contents. That is, when the viewer watches the left-eye image of one content view (content view 2) through the one glass apparatus 200-2, a right-eye lens of the glass apparatus 200-2 and left-eye and right-eye lenses of the other glass apparatus 200-1 are closed to thus watch nothing. Next, when the right-eye lens of the other glass apparatus 200-1 is opened to pass the right-eye image of one content view (content view 1), the left-eye lens of the glass apparatus 200-1 and the left-eye and right-eye lenses of the other glass apparatus 200-2 are closed. As the image frames of the different contents are alternately displayed at a very high speed and after-image effect of the retina remains during the close of the lens, the user can view a natural image. In addition, by viewing the left-eye image with the left eye in a particular content view, viewing the right-eye image with the right eye, and applying a left/right phase difference of the left-eye image and the right-eye image, users wearing the glass apparatuses 200-1 and 200-2 can feel three-dimensional (3D) effect. Yet, the alternate arrangement of the content view may display the left-eye image and the right-eye image of one content view in order and then display the left-eye image and the right-eye image of the other content view in order, which is shown in FIG. 3.

That is, the display apparatus 100 of FIG. 3 can display a left-eye image AL and a right-eye image AR of a 3D content A, and alternately display a left-eye image BL and a right-eye image BR of a 3D content B. In this case, the first glass apparatus 200-1 can open its left and right glasses when the left-eye image AL and the right-eye image AR of the 3D content A are displayed, and the second glass apparatus 200-2 can open its left and right glasses when the left-eye image BL and the right-eye image BR of the 3D content B are displayed.

Thus, the first viewer wearing the first glass apparatus 200-1 can view only the 3D content A, and the second viewer wearing the second glass apparatus 200-2 can view only the 3D content B.

Herein, the shutter glasses are explained by way of example. Those skilled in the art shall understand that polarized glasses can support the multi-view mode by matching a polarization direction of the contents and a polarization direction of the first and second glass apparatuses.

Hereafter, the principle of the 3D effect is described in brief.

In general, the 3D effect perceived by the human complexly results from thickness variation of eye lenses based on a location of an object to observe, an angle difference between both eyes and the object, location and shape differences of the object perceived by left and right eyes, parallax according to movement of the object, psychology, and memory effect.

Binocular disparity resulting from horizontal separation about 6~7 cm between two eyes of the human, can be the most important factor of the 3D effect. That is, the human sees the object with the angle difference according to the binocular disparity, the images coming into the eyes are different from each other because of this difference, and these two images are input to the brain through the retinas. The brain can perceive the original 3D image by accurately uniting the two information.

Thus, when the user views the same image (or object) with the left eye and the right eye in turn through the display apparatus 100, the angle difference of the view points generates to cause the binocular disparity. At this time, when the horizontal phase difference is applied to the left-eye image and the right-eye image, the binocular disparity increases and the 2D image is perceived in the 3D based on the optical illusion. Exemplary embodiments provide the 3D image by applying this principle.

Figure 4:
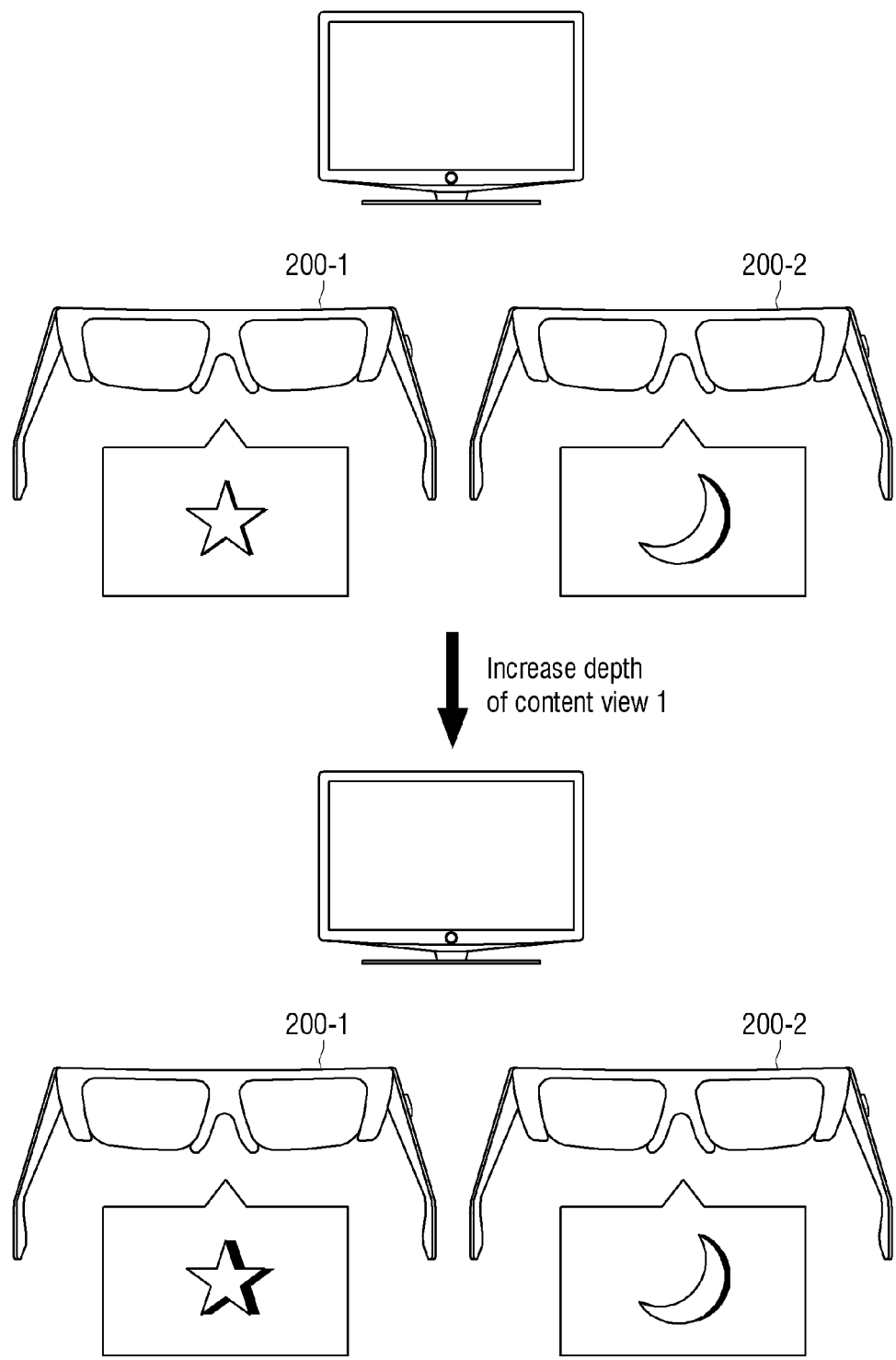
FIG. 4 is a conceptual diagram of 3D image change when a depth of one content view is modified in the display apparatus according to various exemplary embodiments.

However, since the eyesight and the binocular disparity differ per person, it is necessary to adjust the phase difference of the left-eye image and the right-eye image. Some side effects of the 3D display apparatus view have been reported. For example, when the balance central nervous system of the human is stimulated by the change of the binocular disparity, the viewer of the 3D image can feel dizziness or nausea. Hence, a function for controlling the phase difference (hereafter, referred to as a depth) of the left-eye image and the right-eye image is required so that the viewer can avoid the dizziness. In particular, since exemplary embodiments provide a plurality of content views, the viewer of each content view should be able to control his/her depth. FIG. 4 is a conceptual diagram of 3D image change when the depth of one content view is modified in the display apparatus 100 according to various exemplary embodiments. When the user watching one content view controls the depth of his/her content view as shown in FIG. 4, the depth of the corresponding content view needs to be adjusted independently from other content views. This also applied to the common display apparatus used as the personal display apparatus as discussed in the related art.

Now, to address the above shortcomings, the display apparatus 100 and a depth controlling method according to an exemplary embodiment are explained in detail.

Figure 5:
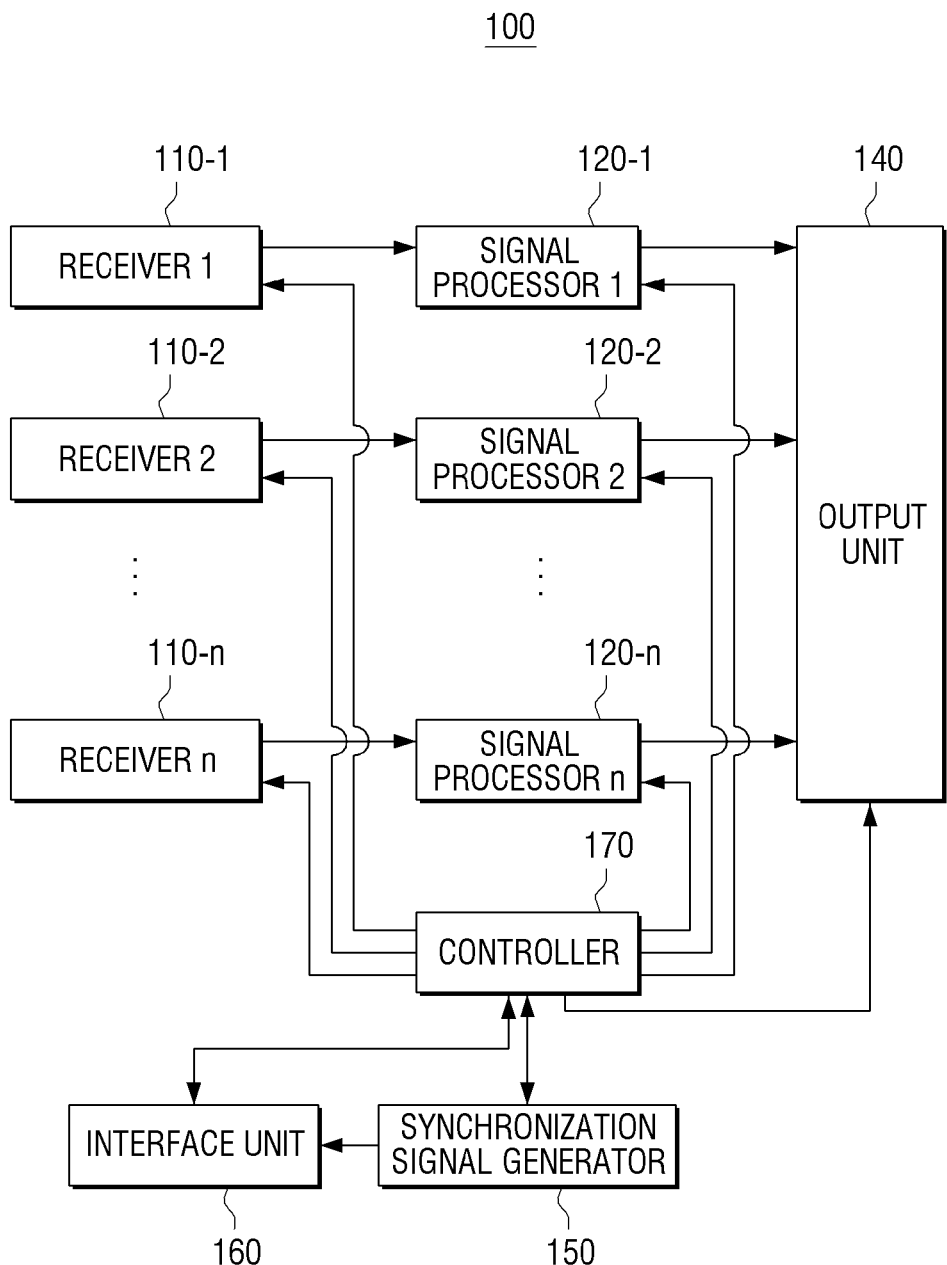
FIG. 5 is a block diagram of the display apparatus according to various exemplary embodiments.

FIG. 5 is a block diagram of the display apparatus 100 according to various exemplary embodiments.

Referring to FIG. 5, the display apparatus 100 according to various exemplary embodiments can include a receiver 110 for receiving the content, a signal processor 120 for processing the received content, an output unit 140 for outputting the processed content, a synchronization signal generator 150 for generating a synchronization signal, an interface unit 160 for communicating with the glass apparatus 200, a storage unit 180 for storing control operation information, a MUX, and a controller 170 for controlling the display apparatus 100. The display apparatus 100 can be implemented using various devices including a display unit, such as TV, mobile phone, PDA, notebook PC, monitor, tablet PC, e-book, digital frame, and kiosk.

The receiver 110 receives the content transmitted. The content can be transmitted in various paths. For example, the receiver 110 can receive a broadcasting program content from a broadcasting station using a broadcasting network, or receive a content file from a web server using Internet. The receiver 110 may receive the content from various recording medium player which is embedded in or connected to the display apparatus 100. The recording medium players indicates a device which plays the content stored to various recording media such as CD, DVD, hard disc, Blu-ray disc, memory card, and USB memory. According to various exemplary embodiments, the content can be three-dimensional.

In practice, a plurality of receivers can be provided as shown in FIG. 5. In this case, a plurality of contents can be received through the receivers 110-1 through 110-n, processed by a plurality of signal processors 120-1 through 120-n, and then displayed. When the content is received from the broadcasting station, the receivers 110-1 through 110-n can include a tuner (not shown), a demodulator (not shown), and an equalizer (not shown). By contrast, when the content is received from a source such as web server, the receivers 110-1 through 110-n can be realized as a network interface card (not shown). When the content is received from various recording medium players, the receivers 110-1 through 110-n can be realized as an interface unit (not shown) connected to the recording medium player, for example, as an audio/video (AV) port, a computer (COMP) port, and a high-definition multimedia interface (HDMI) port. As such, the receivers 110-1 through 110-n can be implemented variously.

The receivers 110-1 through 110-n do not necessarily receive the content from the sources of the same type, and may receive the content from sources of different types. For example, the first receiver 110-1 may include a tuner, a demodulator, and an equalizer, and the second receiver 110-2 may include a network interface card. Notably, the present exemplary embodiment does not exclude other implementations of the receiver.

The signal processor 120 generates an image frame of the content received at the receiver 110. A plurality of signal processors 120-1 through 120-n corresponding to the plurality of the receivers 110-1 through 110-n can be equipped as shown in FIG. 5. That is, the signal processors 120-1 through 120-n generate the image frames by processing the contents received by the receivers 110-1 through 110-n, which are further explained in FIG. 8.

Figure 8:
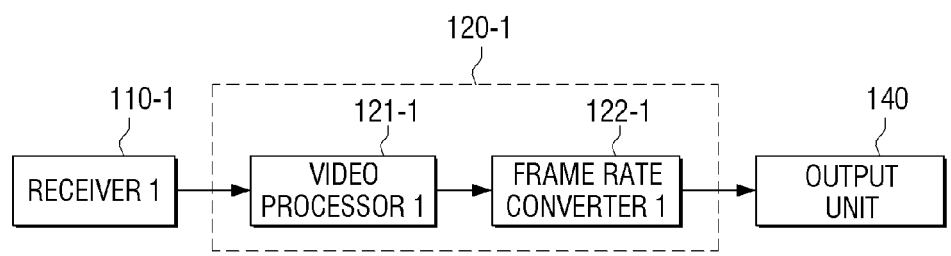
FIG. 8 is a block diagram of a signal processor of the display apparatus of FIG. 5.

FIG. 8 is a block diagram of the signal processor 120 according to various exemplary embodiments. As shown in FIG. 8, the first signal processor 120-1 includes a first video processor 121-1 and a frame rate converter 122-1. While the first signal processor 120-1 alone is shown in FIG. 8, the same structure of FIG. 8 can be applied to the other signal processors 120-2 through 120-n.

The MUX can multiplex and output the image frames to alternately arrange the image frame of the first content through the image frame of the n-th content at least one by one.

The first video processor 121-1 processes video data of the content received from the first receiver 110-1. In detail, the first video processor 121-1 can include a decoder (not shown) for decoding the video data, and a scaler (not shown) for scaling up or down according to a screen size of the output unit 140.

Besides, the first video processor 121-1 may convert the video data into a data format corresponding to the first frame rate converter 122-1. In detail, when the input video data is in the top-to-bottom format and the first frame rate converter 122-1 processes the frame in the side-by-side format, the first video processor 121-1 can convert the image frames of the contents into the side-by-side format by arranging them side by side in the horizontal direction.

The first frame rate converter 122-1 converts a frame rate of the content output from the first video processor 121-1 to a multi-content display rate by referring to an output rate of the display apparatus 100. In detail, when the display apparatus 100 operates at 60 Hz, the first frame rate converter 122-1 can convert the frame rate of each content to n×60 Hz. In the 3D content conversion according to various exemplary embodiments, the left-eye image and the right-eye image should be contained and thus the frame rate can double.

The output unit 140 outputs the processed contents. The output unit 140 can be the display unit 140. In this case, the output unit 140 outputs a plurality of content views by alternately arranging the image frames of the contents generated by the signal processors 120-1 through 120-n. The output unit 140 multiplexes and displays the image frames of the contents output from the signal processors 120-1 through 120-n to alternately arrange them. In some cases, the output unit 140 may scale up or down the image frame of the content according to the screen size.

For example, in the display apparatus of the shutter glass type, the output unit 140 can alternately arrange and display the left-eye image frame of the first content, the left-eye image frame of the second content, the right-eye image frame of the first content, the right-eye image frame of the second content, . . . , and the right-eye image frame of the n-th content. However, the left-eye image frame of the first content, the right-eye image frame of the first content, the left-eye image frame of the second content, and the right-eye image frame of the second content may be alternately arranged in this order. The user can watch his/her intended content view by wearing the glass apparatus 200 which interworks at the output timing of a particular content view of the output unit 140. In detail, the glass apparatus 200 includes a left-eye shutter glass and a right-eye shutter glass. The left-eye shutter glass and the right-eye shutter glass are alternately opened and closed in the 3D content view. Accordingly, the user can watch the 3D content view separately from other users.

As such, a mode for alternately arranging and outputting the image frames of the contents can be referred to as a multi-view mode (or a dual-view mode). In a normal mode (or a single-view mode) for outputting either the 2D content or the 3D content, the display apparatus 100 can process the contents by activating only one of the receivers 110-1 through 110-n. When the user selects the multi-view mode in the normal mode, the display apparatus 100 can process the data by activating the other receivers.

When the plurality of the 3D contents is used, the output unit 140 can multiplex the left-eye images and the right-eye images of the 3D contents provided from a plurality of frame rate converters 122-1 through 122-n in a preset arrangement, and alternately arrange them with the image frame of the other content.

Although it is not depicted in FIG. 5, the display apparatus 100 can further include a component for differently providing audio data of the content views per user in the multi-view mode. That is, The display apparatus 100 can further include a demultiplexer (not shown) for separating the video data and the audio data from the contents received at the receivers 110-1 through 110-n, an audio decoder (not shown) for decoding the separated audio data, and a modulator (not shown) for modulating the decoded audio data to different frequency signals. The output unit 140 can send the modulated audio data to the glasses apparatus 200. The audio data output from the output unit 140 is provided to the user through an output means such as earphone of the glass apparatus 200. The details of such components are omitted here.

Meanwhile, in some cases, when the content includes additional information such as Electronic Program Guide (EPG) and subtitle, the demultiplexer may additionally separate the additional data from the content. The display apparatus 100 may add the subtitle processed for the display through an additional data processor (not shown), to the corresponding image frame.

The synchronization signal generator 150 generates the synchronization signal for synchronizing the glass apparatus 200 corresponding to the content, according to the display timing of the content. That is, the synchronization signal generator 150 generates the synchronization signal for synchronizing the glass apparatus 200 at the display timing of the image frame of the content in the multi-view mode.

Figure 6:
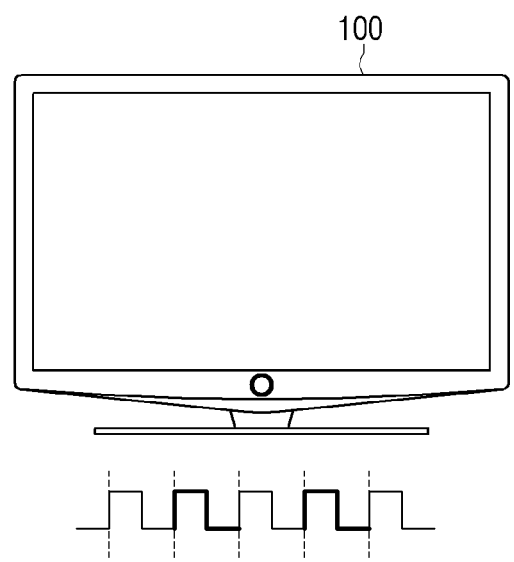
FIGS. 6 and 7 are diagrams of a method for transmitting a synchronization signal according to various exemplary embodiments.
Figure 6:
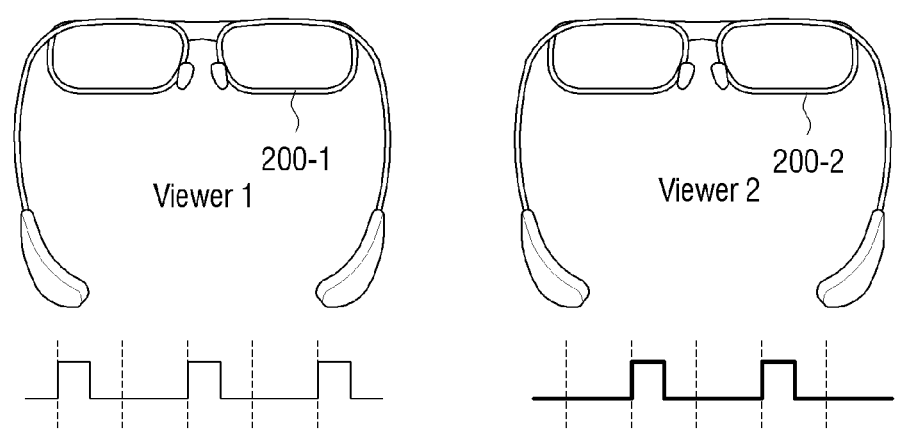
Figure 7:
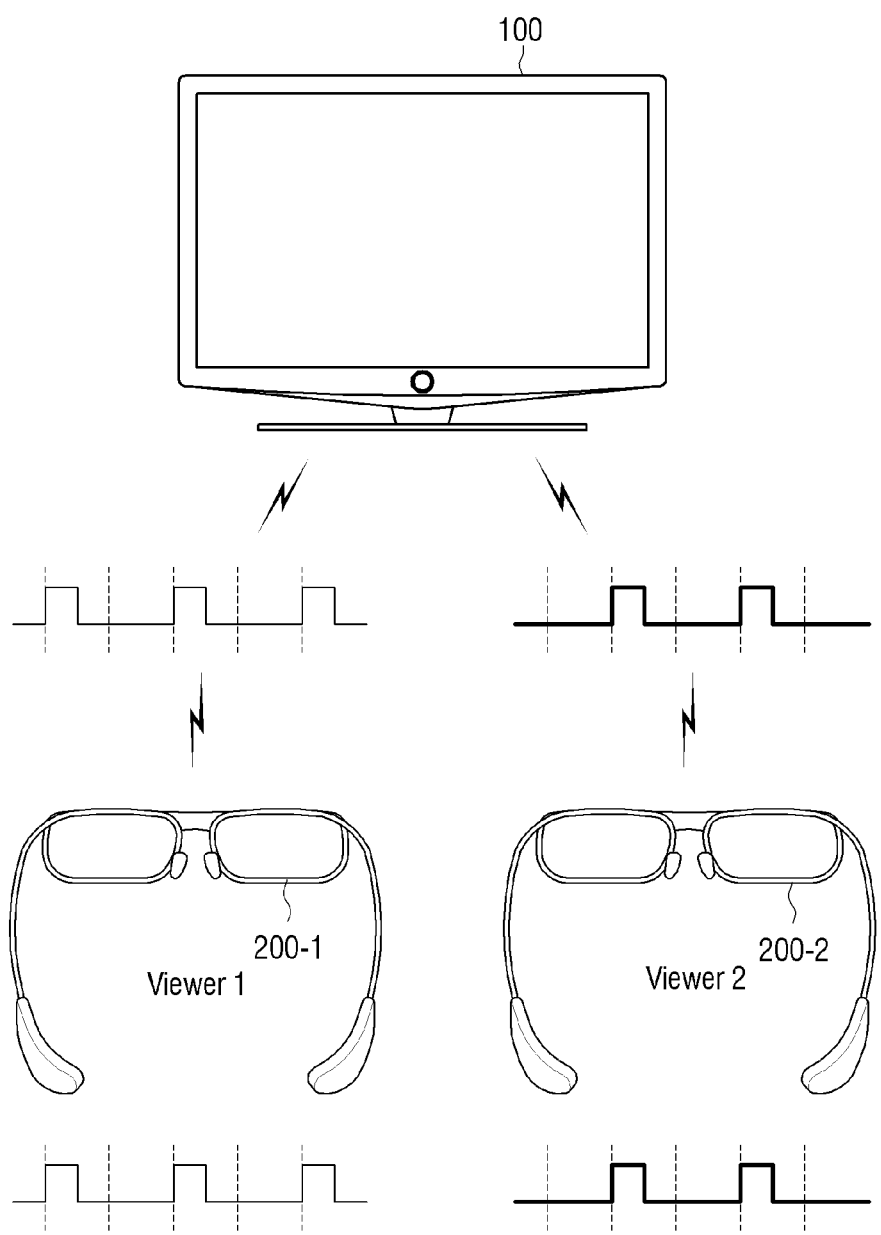

A synchronization method of the display apparatus 100 and the glass apparatus 200 is explained by referring to FIGS. 6 and 7. Referring to FIG. 6, the display apparatus 100 can broadcast or multicast a single signal generated by multiplexing synchronization signals corresponding to the first glass apparatus 200-1 and the second glass apparatus 200-2, and the glass apparatuses 200-1 and 200-2 can open or close their shutter glasses in synchronization with the synchronization signal corresponding to a user command (for example, a channel change command) of the corresponding signal.

By contrast, as shown in FIG. 7, the display apparatus 100 may unicast the synchronization signal corresponding to the first glass apparatus 200-1 and the second glass apparatus 200-2 to the glass apparatuses 200-1 and 200-2 respectively, and the glass apparatuses 200-1 and 200-2 may receive the corresponding synchronization signal.

The interface unit 160 communicates with the glass apparatus 200. In so doing, the interface unit 160 can send the synchronization signal to the glass apparatus 200 or pair with the glass apparatus 200 by communicating with the glass apparatus 200 according to various wireless schemes.

For example, the interface unit 160 can include a Bluetooth communication module for communicating with the glass apparatus 200, generating the synchronization signal as a transport stream according to the Bluetooth communication protocol, and sending the transport stream to the glass apparatus 200.

The transport stream includes time information for opening or closing the shutter glass of the glass apparatus 200 in synchronization with the display timing of the content. More specifically, the time information includes information of a left shutter open offset, a left shutter close offset, a right shutter open offset, and a right shutter close offset of the glass apparatus 200.

The offset is delay information from a reference time defined per content to the open or close time of the shutter glass. That is, when the offset passes from the reference time, the glass apparatus 200 opens or closes the left shutter glass and the right shutter glass.

For example, the reference time can be the time point when a vertical synchronization signal (that is, frame sync) generates in the image frame. The transport stream can include reference time information, and the glass apparatus 200 can set the time for generating the vertical synchronization signal to open or close the shutter glass based on the reference time information.

When the number of the content views changes and the mode of the display apparatus 100 is changed, the open/close offset of the shutter glass of the glass apparatus 200 is newly defined according to the synchronization signal for the changed content view and the transport stream includes this new information.

Besides, the transport stream can further include cycle information of the frame sync, and decimal point information when the cycle of the frame sync has a decimal point.

Meanwhile, the interface unit 160 can conduct the pairing based on the Bluetooth communication scheme by transmitting and receiving Bluetooth advice address and PIN code to and from the glass apparatus 200.

When the pairing is completed, information of the glass apparatus 200, for example, a device ID can be registered to the interface unit 160. Hence, the interface unit 160 matches the display timing of the content and the information of the glass apparatus 200, and sends the transport stream to the glass apparatus 200 based on the information obtained through the pairing. When receiving the transport stream, the glass apparatus 200 can identify the display timing corresponding to its information, and open or close the shutter glass according to the identified display timing. For example, the interface unit 160 can match different glass apparatus information to the contents according to the arrangement order of the image frames of the contents. That is, when two contents are alternately provided in the multi-view mode, the interface unit 160 can match the first, third, . . . , and n-th content image frames to the first glass apparatus information, and match the second, fourth, . . . , and (n+1)-th content image frames to the second glass apparatus information (n is an odd number). When receiving the synchronization signal, the glass apparatus can identify the display timing corresponding to its information, and open or close the shutter glass according to the identified display timing.

In the above exemplary embodiment, the interface unit 160 and the glass apparatus 200 communicate with each other according to the Bluetooth communication scheme by way of example. In other words, the interface unit 160 and the glass apparatus 200 can adopt other communication schemes such as infrared communication and Zigbee, and various wireless communication schemes for transmitting and receiving signals by building a communication channel in a short range.

The interface unit 160 can provide the glass apparatus 200 with an InfraRed (IR) synchronization signal having a different frequency. In this case, the glass apparatus 200 can receive a synchronization signal of a particular frequency and open or close the shutter glass according to the display timing of the corresponding content.

In so doing, the interface unit 160 can transmit to the glass apparatus 200 the IR signal which alternately repeats a high level during a first cycle and a low level during a second cycle at preset time intervals based on the synchronization information. The glass apparatus 200 can open the shutter glass during the first cycle of the high level and close the shutter glass during the second cycle of the low level. The synchronization signal may be generated in other various fashions.

Hereafter, the controller 170 is explained. The controller 170 controls the operations of the display apparatus 100. That is, the controller 170 controls the receiver 110 and the signal processor 120 to receive and process the content, and controls the synchronization signal generator 150 to perform the synchronization. In particular, when a depth control command is input for one of the content views, the controller 170 can control the signal processor 120 to control the depth of the corresponding content view. Since the binocular disparity differs per person even in the same 3D content as mentioned earlier, it is necessary to adjust the depth per content view. An exemplary embodiment can control the depth for one of the content views, which does not affect the other content views. Thus, it is possible to set the depth for every user and to minimize the side effects of the 3D content being watched.

Figure 9:
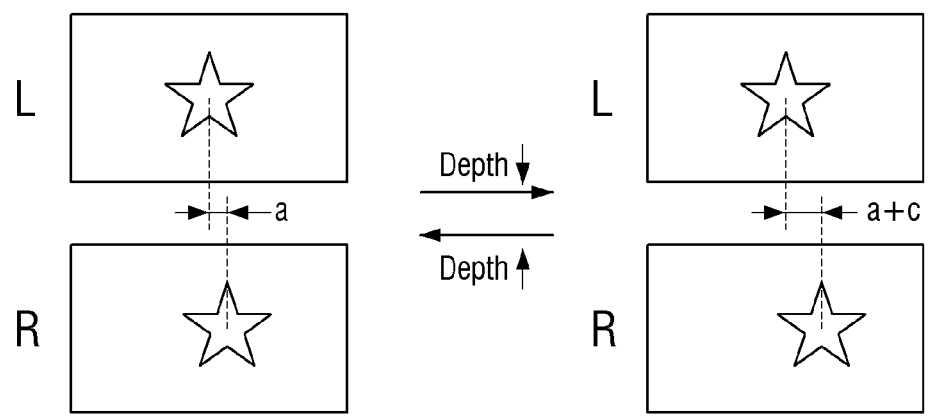
FIG. 9 is a diagram of an image processing method when the depth is controlled.

Now, an image processing method when the depth is controlled is explained by referring to FIG. 9. FIG. 9 is a diagram of the image processing method when the depth is controlled. To represent the phase difference between the same objects in the left-eye image L and the right-eye image R displayed on the screen, both of the left-eye image L and the right-eye image R are shown in FIG. 9. In the left screen of FIG. 9, the phase difference of the left-eye image L and the right-eye image R for the star-shaped object is 'a'.

When an external manipulation command for lowering the depth is input, the controller 170 processes each object to increase the phase difference between the same objects in the left-eye image L and the right-eye image R. Particularly, when the manipulation command for lowering the depth is input, the controller 170 increases the phase difference of the left-eye image L and the right-eye image R of the star-shaped object to 'a+c' as shown in the right screen of FIG. 9. Thus, the depth of the whole screen including the star-shaped object is lowered. Conversely, when an external manipulation command for raising the depth is input, the controller 170 processes the objects to decrease the phase difference between the same objects in the left-eye image L and the right-eye image R. That is, when the manipulation command for raising the depth is input in the right screen of FIG. 9, the controller 170 processes the object to make the phase difference of the left-eye image L and the right-eye image R of the star-shaped object '(a+c)−c=a' as shown in the left screen of FIG. 9. Thus, the depth of the whole screen including the star-shaped object is increased. The phase difference can be changed by moving only the location of the object in the left-eye image L, by moving only the location of the object in the right-eye image R, or by moving the locations of both objects in the left-eye image L and the right-eye image R. The image processing method for decreasing the depth and the image processing method for increasing the depth are merely exemplary to ease the understanding. Hence, the present exemplary embodiment can be equally applied to other image processing methods for decreasing or increasing the depth.

Figure 10:
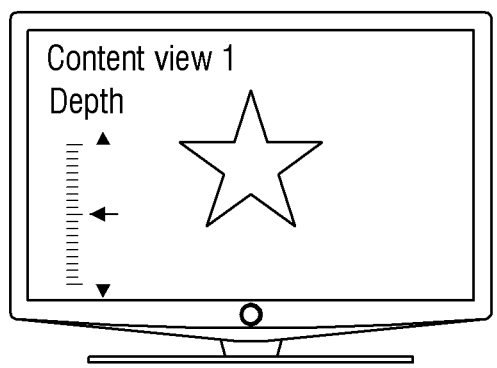
FIG. 10 is a diagram of an interface for controlling the depth.

Hereafter, an interface for controlling the depth on the screen of the display apparatus 100 is described. FIG. 10 depicts an interface for controlling the depth.

Referring to FIG. 10, the user can control the depth using the glass apparatus 200 or a control command input means such as remote control. In so doing, the screen of the display apparatus 100 represents the corresponding content view and current depth information. The depth is represented using a graph in FIG. 10, and the user can send the depth control command to the display apparatus 100 using Up and Down buttons of the remote control. In the glass apparatus 200, the user can input the control command through an input unit 270, which will be explained. The interface unit 160 of the display apparatus 100 receives the depth control command, and the controller 170 controls the depth of the content view by identifying the input depth control command. When the user demands to increase the depth using the Up button of the remote control, the controller 170 controls the depth to decrease the phase difference of the left-eye image and the right-eye image of the content view of the user. By contrast, when the user demands to decrease the depth using the Down button of the remote control, the controller 170 controls the depth to increase the phase difference of the left-eye image and the right-eye image of the content view of the user.

Figure 11:
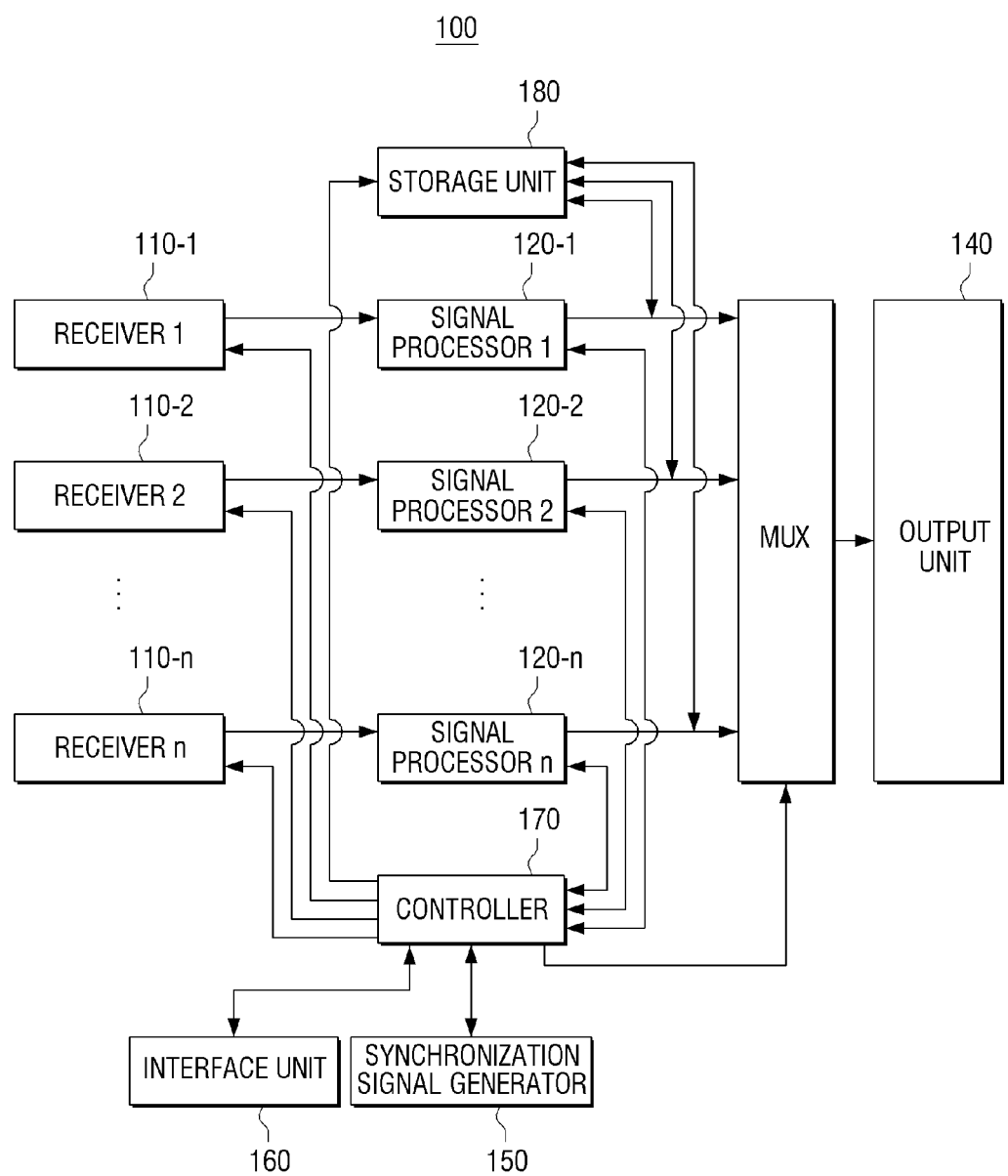
FIG. 11 is a block diagram of the display apparatus according to various exemplary embodiments.

Meanwhile, when the depth information is stored to the display apparatus 100, the same user does not have to set the depth every time he/she watches the display apparatus 100. Hence, the user can use the display apparatus 100 easily. For doing so, the display apparatus 100 can further include a storage unit 180 for storing depth control state information as shown in FIG. 11. Every time the user turns on the display apparatus 100, the user can easily fetch the depth information stored to the storage unit 180 without having to input the new depth. Alternatively, the display apparatus 100 can automatically fetch the depth information so that the user does not have to separately fetch the depth information.

That is, when the depth is controlled for one of the content views and then corresponding content view is turned off and then turned on, the controller 170 can control the signal processor 120 to fetch the depth control state information before the turn-off of the corresponding content view from the storage unit 180 and to output the content view according to the depth control state information. For example, when one content view is set with a certain depth and the content view is subsequently turned off, and the user turns on the content view again, the user does not have to reset the depth or fetch the stored depth and the controller 180 controls the signal processor 120 to output the content view by fetching the depth information set in the content view from the storage unit 180.

According to various exemplary embodiments, when the display apparatus 100 switches from the single-view mode to the multi-view mode, the controller 170 may control the signal processor 120 to output the corresponding content view by fetching the depth control state information of the content view newly turned on, from the storage unit 180.

Figure 12:
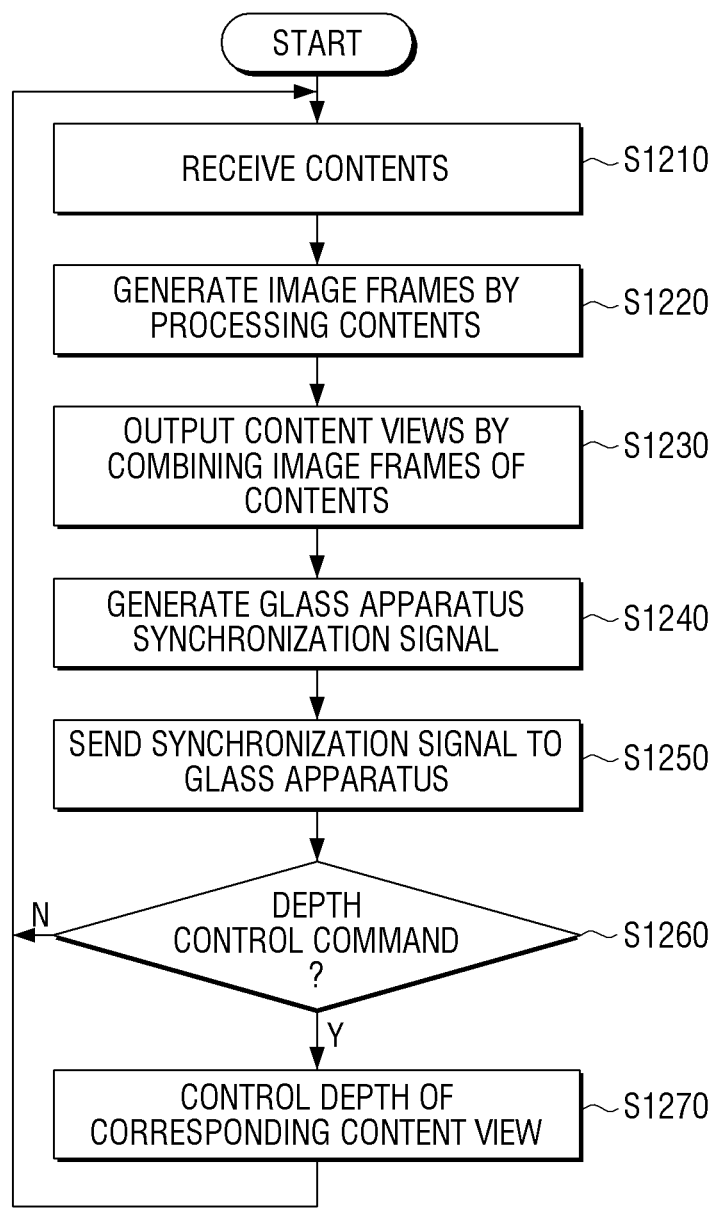
FIG. 12 is a flowchart of a method for controlling the depth according to various exemplary embodiments.
Figure 13:
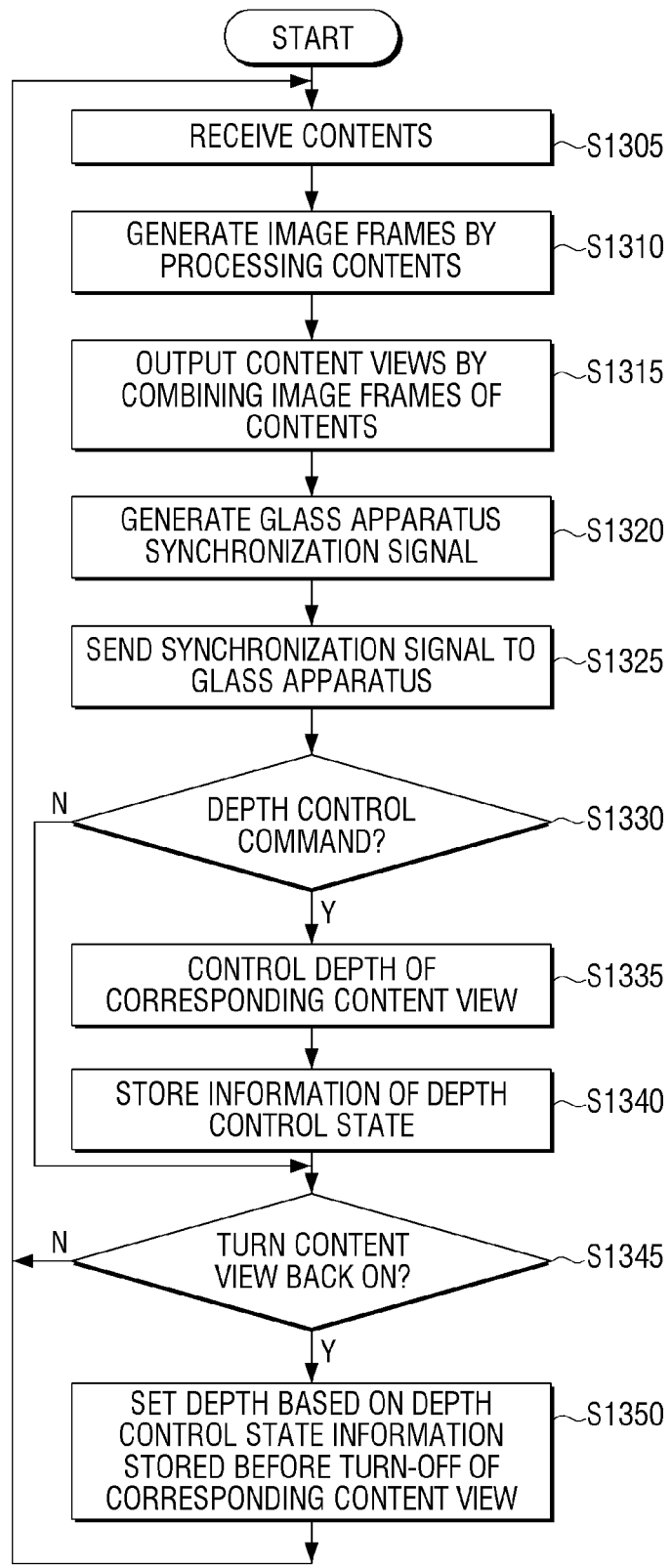
FIG. 13 is a flowchart of a depth controlling method for setting the depth according to depth information stored when a content view is turned on according to various exemplary embodiments.

Hereafter, depth controlling methods according to various exemplary embodiments are explained by referring to FIGS. 12 and 13.

FIG. 12 is a flowchart of a method for controlling the depth according to various exemplary embodiments, and FIG. 13 is a flowchart of a depth controlling method for setting the depth according to the depth information stored when the content view is turned on according to various exemplary embodiments.

Referring to FIGS. 12 and 13, the depth controlling method according to various exemplary embodiments receives a plurality of contents (S1210 and S1305), generates the image frames by processing the contents (S1220 and S1310), and outputs a plurality of content views by combining the image frames of the contents (S1230 and S1315). The depth controlling method generates the synchronization signal for synchronizing the glass apparatus matched to the content views (S1240 and S1320) and transmits the synchronization signal to the glass apparatus (S1250 and S1325). When the depth control command is input (S1260—Y and S1330—Y), the depth controlling method adjusts the depth for the corresponding content view (S1270 and S1335). At this time, the depth controlling method stores the depth control state information (S1340). When the depth of one of the content views is adjusted and the corresponding content view is turned off and then turned on again (S1345—Y), the depth controlling method outputs the content view according to the depth control state information stored before the corresponding content view is turned off (S1350). Particularly, when the display apparatus which outputs the content views switches from the single-view mode to the multi-view mode, the depth controlling method can output the corresponding content view according to the prestored depth control state information of the content view newly turned on.

According to various exemplary embodiments, the depth of one of the content views can be controlled without affecting the other content views, and the user can watch the 3D image for the user. The set depth information is stored and the depth is automatically set when the content view is turned back on, the user can easily use the display apparatus 100 without having to reset the depth.

Figure 14:
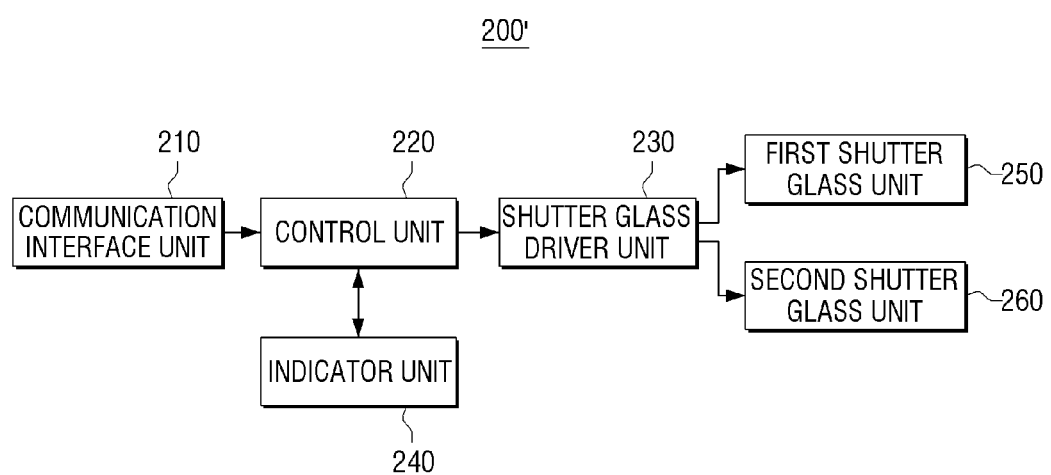
FIGS. 14 and 15 are block diagrams of the glass apparatus according to various exemplary embodiments.
Figure 15:
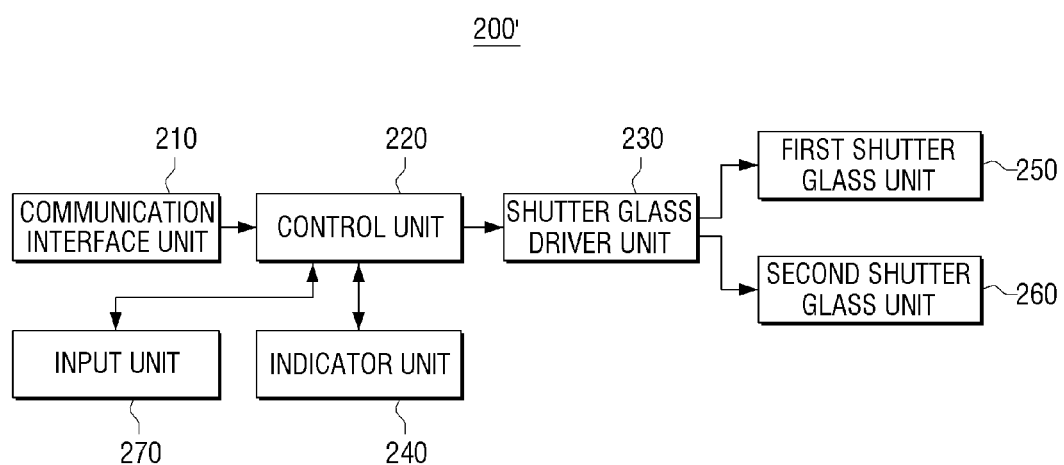

Now, the glass apparatus 200 according to various exemplary embodiments is explained by referring to FIGS. 14 and 15. FIGS. 14 and 15 are block diagrams of the glass apparatus 200 according to various exemplary embodiments. In particular, the display apparatus 200 of FIG. 14 interworks with the display apparatus 100 of FIG. 5 for alternately outputting the plurality of contents on the image frame basis, and includes a communication interface unit 210, a control unit 220, a shutter glass driver unit 230, an indicator unit 240, a first shutter glass unit 250, and a second shutter glass unit 260. The glass apparatus 200 can further include the input unit 270 as shown in FIG. 15.

The input unit 270 receives the turn-on command, the turn-off command, or the depth change command of the glass apparatus 200. The input unit 270 of the glass apparatus 200 which is matched to one of the content views, receives the turn-on command, the turn-off command, or the depth change command. The communication interface unit 210 sends the received command to the display apparatus 100. According to the turn-on command, the glass apparatus 200 is turned on and the mode of the display apparatus 100 can be altered according to the content view selection. When the turn-off command is input, the glass apparatus 200 is turned off and the display apparatus 100 detects whether the number of the content views matched to the glass apparatus 200 changes and switches the mode when detecting the change. When the depth change command is input, the display apparatus 100 modifies the depth of the corresponding content view without affecting the other content views. Notably, the turn-on command, the turn-off command, or the depth change command is not necessarily input through the input unit 270, and may be input through a separate device such as remote control.

The input unit 270 can receive a user selection signal for selecting one of the content views.

At this time, the control unit 220 can select one of the content views according to the user selection signal input through the input unit 270, control the shutter glass driver unit 230 to open the first and second shutter glass units 250 and 260 according to the display timing of the selected content view, and control the indicator unit 240 to indicate the selected content view.

Besides, the input unit 270 can receive a pairing command for pairing with the display apparatus 100, a mode setting command for setting a private or public mode, and a 3D mode or dual-view mode setting command.

For example, the input unit 270 can be implemented using at least one of a touch sensor, a manipulation button, and a slide switch.

The communication interface unit 210 communicates with the display apparatus 100. The communication interface unit 210 can be implemented using a Bluetooth communication module for receiving the synchronization signal and sending the turn-on command, the turn-off command, or the depth change command input through the input unit 270 to the display apparatus 100 by communicating with the display apparatus 100.

As stated earlier, the synchronization signal can be received in the form of the transport stream according to the Bluetooth communication standard, and can include the time information for opening or closing the first shutter glass unit 250 and the second shutter glass unit 260 of the glass apparatus 200 in synchronization with the display timing of the content. The information carried by the transport stream has been described in FIG. 5 and shall not be further mentioned.

On the other hand, the communication interface unit 210 can be implemented using an IR reception module for receiving the IR synchronization signal of a specific frequency. In this case, the synchronization signal includes the time information for opening or closing the first shutter glass unit 250 and the second shutter glass unit 260 of the glass apparatus 200 in synchronization with the display timing of one of the contents.

Meanwhile, the communication interface unit 210 may receive information of an image frame rate and an image frame cycle of each content from the display apparatus 100.

The control unit 220 controls the operations of the glass apparatus 200. Particularly, the control unit 220 controls the shutter glass driver unit 230 by forwarding the synchronization signal received at the communication interface unit 210 to the shutter glass driver unit 230. That is, based on the synchronization signal, the control unit 220 controls the shutter glass driver unit 230 to generate a driving signal to drive the first shutter glass unit 250 and the second shutter glass unit 260. In addition, the control unit 220 can control the communication interface unit 210 to send the turn-on command, the turn-off command, or the depth change command input through the input unit 270 to the display apparatus 100.

The shutter glass driver unit 230 generates the driving signal based on the synchronization signal received from the control unit 220. In particular, based on the synchronization signal, the shutter glass driver unit 230 can open the first shutter glass unit 250 and the second shutter glass unit 260 according to the display timing of one of the contents displayed by the display apparatus 100.

The first shutter glass unit 250 and the second shutter glass unit 260 open or close the shutter glass according to the driving signal received from the shutter glass driver unit 230. In detail, the first shutter glass unit 250 and the second shutter glass unit 260 open the corresponding shutter glass when one image of one of the contents is displayed, and close the same shutter glass when the other image of the one content is displayed. When other content is displayed, the first shutter glass unit 250 and the second shutter glass unit 260 close both shutter glasses. Hence, the user wearing the glass apparatus 200 can view one content in three dimensions. Further detailed operations have been described already and shall be omitted for brevity.

Meanwhile, in the above embodiment, the display apparatus 100 generates and transmits the synchronization signal corresponding to the display timing of the content, to the glass apparatus 200 by way of example.

The display apparatus 100 may generate the synchronization signal corresponding to the display timing of the content as one transport stream according to the Bluetooth communication standard. That is, the display apparatus 100 can generate one transport stream including all of time information for opening or closing the shutter glass of the glass apparatus 200 in synchronization with the display timing of the first content, time information for opening or closing the shutter glass of the glass apparatus 200 in synchronization with the display timing of the second content, and time information for opening or closing the shutter glass of the glass apparatus 200 in synchronization with the display timing of the n-th content.

In this case, the display apparatus 100 can generate the transport stream by matching the display timing of the content and the information of the glass apparatus 200. For example, the display apparatus 100 can match different information of the glass apparatus 200 to each content according to the arrangement order of the image frames of the contents. That is, when two contents are provided in the multi-view mode, the display apparatus 100 can match the first, third, . . . , and n-th content image frames to the first glass apparatus information, and match the second, fourth, . . . , and (n+1)-th content image frames to the second glass apparatus information (n is an odd number).

Upon receiving the synchronization signal, the glass apparatus 200 can identify the display timing corresponding to its information, and open or close the shutter glass according to the identified display timing. That is, the glass apparatus 200 can control the shutter glass driver unit 230 to sequentially generate the driving signal based on the synchronization signals corresponding to the contents of the transport stream. Hence, the first shutter glass unit 250 and the second shutter glass unit 260 are opened every time the image frame of each content is displayed.

The indicator unit 240 can display the viewable content view of the plurality of content views under the control of the control unit 220.

Herein, the indicator unit 240 can be implemented using at least one of a plurality of light emitting devices and a display unit.

The indicator unit 240 can be implemented using the light emitting devices, for example, a plurality of Light Emitting Diodes (LEDs). The LEDs can be disposed in, but not limited, the exterior of temple arms of the glass apparatus 200. Herein, the LEDs can be implemented using different color LEDs corresponding to the content views respectively.

In this case, the control unit 220 can turn on the color light emitting device corresponding to the viewable content view among the plurality of the light emitting devices. For example, when the first content view is synchronized with the glass apparatus 200, the control unit 220 can switch on a red-color LED module. For the second content view, the control unit 220 can switch on a blue-color LED module. Notably, the color of the LED module is not limited to the red and the blue.

Meanwhile, in the above exemplary embodiment, the LED modules corresponding to the content views respectively are equipped. Alternatively, the single LED module may indicate the viewable content view by controlling its emission. For example, different content views may be indicated by keeping the LED module turned on when the first content view is the viewable content view and repeatedly flickering the LED module for the second content view.

The indicator unit 240 may include the display unit. The display unit can be implemented using a Liquid Crystal Display (LCD). In some cases, the display unit may be implemented using a Cathode-Ray Tube (CRT), a Plasma Display Panel (PDP), and Organic LEDs (OLEDs).

In this case, the control unit 220 can control the display unit to display information of the viewable content view among the plurality of content views.

For example, the control unit 220 can indicate an identification number of the viewable content view using, for example, A and B (or 1 and 2 or L and R). In some cases, the control unit 220 may indicate a channel number, a title, and a content type.

In the meantime, based on the synchronization signal received through the communication interface unit 210, the control unit 220 can control the indicator unit 240 to indicate the viewable content view information of the glass apparatus 200.

Hence, the user can check which content the other user is watching and thus confusion in the screen selection can be prevented.

Figure 16:
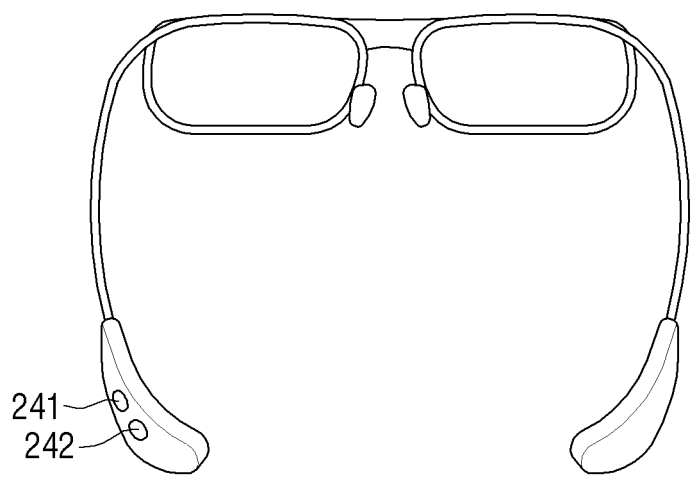
FIGS. 16 and 17 are diagrams of an exterior of the glass apparatus of FIGS. 14 and 15 according to various exemplary embodiments.
Figure 17:
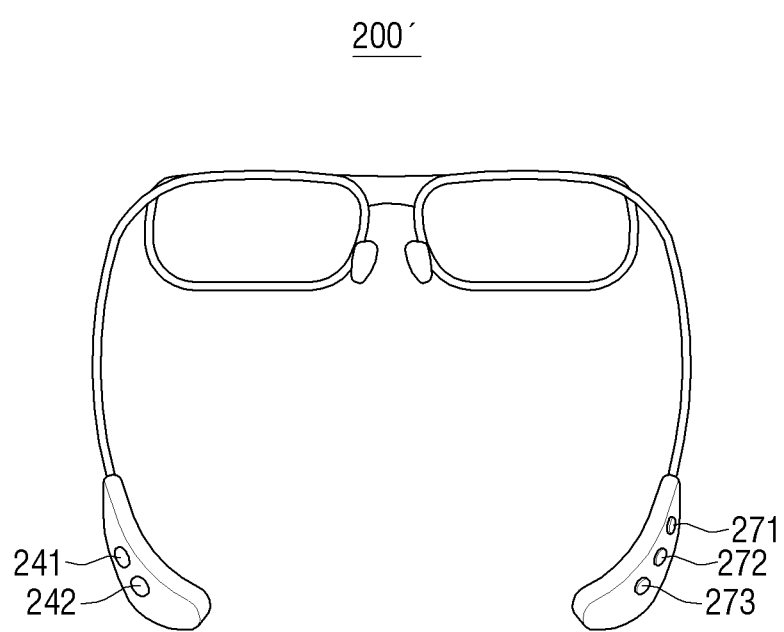

FIGS. 16 and 17 are diagrams of an exterior of the glass apparatus of FIGS. 14 and 15 according to various exemplary embodiments.

As shown in FIG. 16, the glass apparatus 200 can include a plurality of light emitting devices 241 and 242 for indicating the viewable content view.

Herein, the light emitting devices 241 and 242 can be implemented using, but not limited to, different color LED modules.

Although it is not depicted in the drawings, the viewable content view may be indicated by controlling the light emission, for example, a light emission time and a light emission cycle of one light emitting device.

The glass apparatus 200' can include a plurality of input buttons 271, 272, and 273 as well as the light emitting devices 241 and 242 as shown in FIG. 17.

The input buttons 271, 272, and 273 can receive different user commands respectively as stated earlier.

For example, the input buttons 271, 272, and 273 can receive the pairing command for pairing with the display apparatus 100, the content change command, and the mode setting command for setting the private or public mode.

Notably, the form of the input button is merely exemplary and can be realized using a touch sensor and a slide switch. In some cases, the display apparatus 100 can provide a menu.

Figure 18:
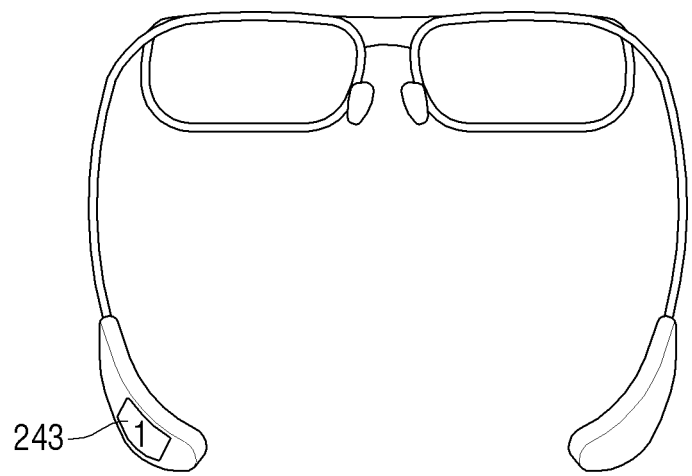
FIGS. 18 and 19 are diagrams of another exterior of the glass apparatus of FIGS. 14 and 15 according to various exemplary embodiments.
Figure 19:
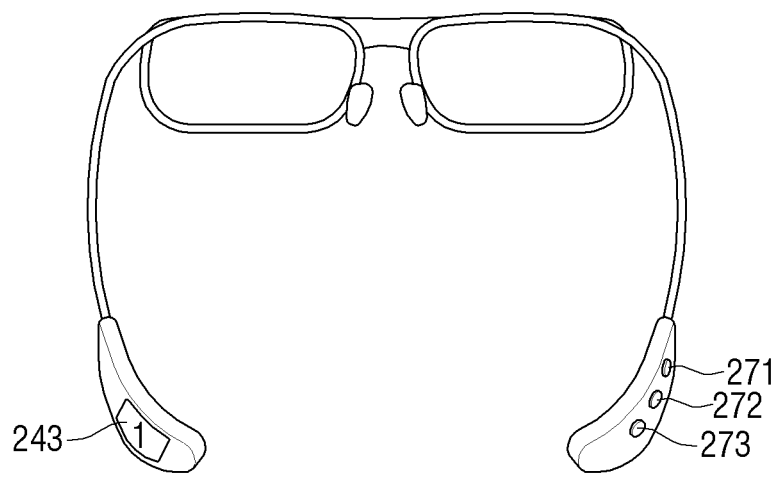

FIGS. 18 and 19 are diagrams of another exterior of the glass apparatus of FIGS. 14 and 15 according to various exemplary embodiments.

As shown in FIGS. 18 and 19, the glass apparatuses 200 and 200' can include a display unit 243.

Herein, the display unit 243 can indicate an identification number of the viewable content view using, for example, A and B (or 1 and 2 or L and R).

Figure 20:
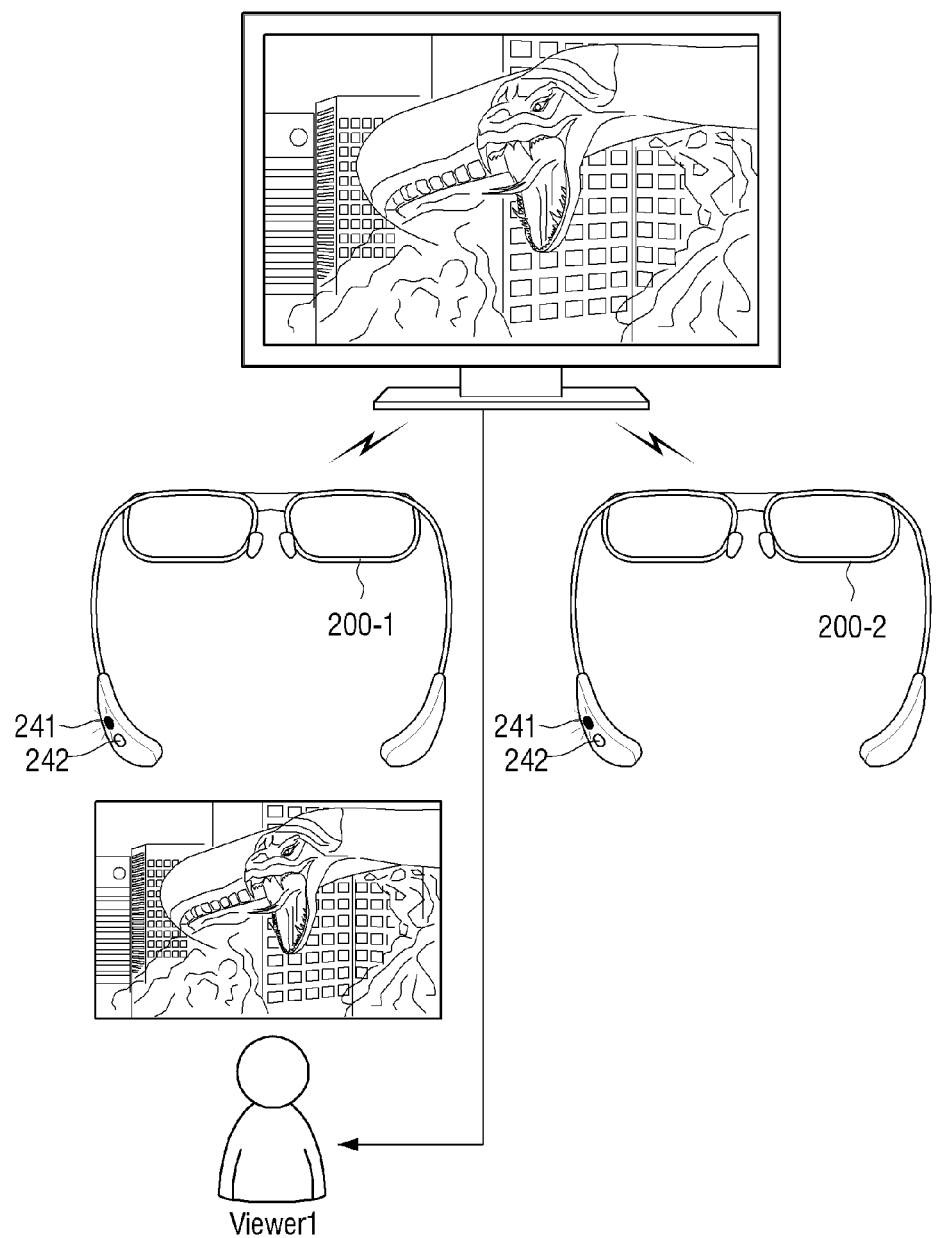
FIGS. 20 and 21 are diagrams of a method for driving the glass apparatus according to an exemplary embodiment.
Figure 21:
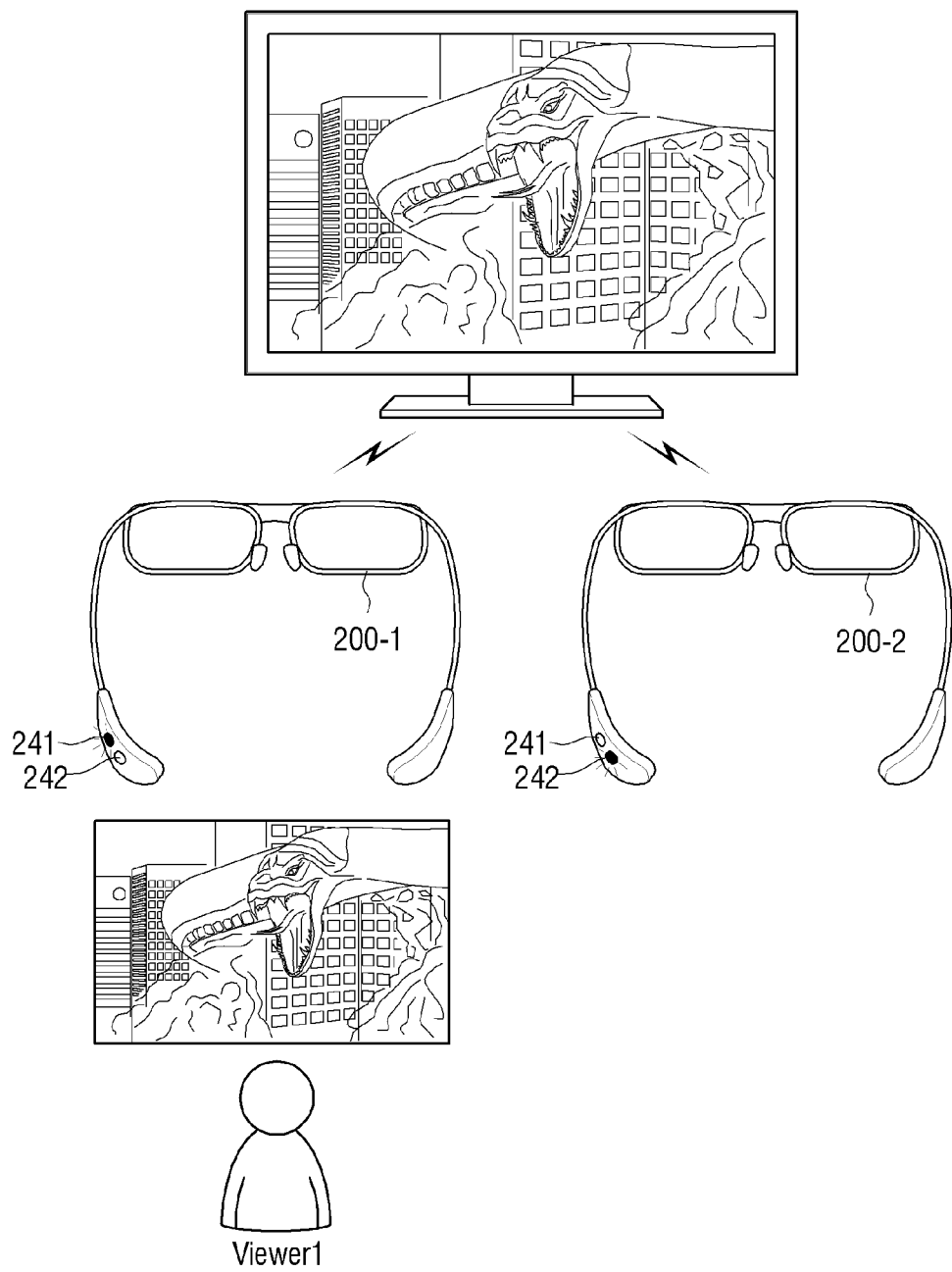

FIGS. 20 and 21 are diagrams of a method for driving the glass apparatus according to an exemplary embodiment.

As shown in FIGS. 20 and 21, when a first viewer watches a first content, the first glass apparatus 200-1 the first viewer is wearing can switch on a light emitting device 241-1 corresponding to the first content. At this time, the second glass apparatus 200-2 the user is not wearing can switch on the light emitting device 241-1 corresponding to the first content when the same first content as the first glass apparatus 200-1 of the first viewer is displayed, and switch on the light emitting device 241-2 corresponding to the second content when the second content different from the first glass apparatus 200-1 is displayed. Hence, the user, who is not wearing the glass apparatus, can identify the type of the content displayed by the glass apparatus.

FIG. 22 is a flowchart of the method for driving the glass apparatus according to an exemplary embodiment.

The method for driving the glass apparatus including the first and second shutter glass units of FIG. 22 receives the synchronization signal from the display apparatus (S2210).

Based on the synchronization signal received in S2210, the method drives the first and second shutter glass units to watch one of the content views (S2220).

Next, the method indicates the viewable content view among the content views (S2230).

Herein, the glass apparatus can include a plurality of light emitting devices of different colors corresponding to the respective content views. In this case, the indicating operation of S2230 can turn on the color light emitting device corresponding to the viewable content view among the light emitting devices.

Alternatively, the glass apparatus can include a display unit. In this case, the indicating operation of S2230 can display the information of the viewable content view among the content views through the display unit.

The driving operation of the first and second shutter glass units of S2220 can include receiving the user selection signal, selecting one of the content views according to the user selection signal, and opening the first and second shutter glass units according to the display timing of the selected content view.

These operations have been explained already and shall not be further described and illustrated.

As set forth above, even when the user does not wear the glasses, the user can identify the viewable content view of each glass apparatus.

Meanwhile, a program for executing the methods according to various exemplary embodiments can be stored and used in various recording media.

Specifically, a code for executing the methods can be stored to various terminal-readable recording media such as Random Access Memory (RAM), flash memory, Read Only Memory, (ROM), Erasable Programmable ROM (EPROM), Electronically Erasable and Programmable ROM (EEPROM), register, hard disc, removable disc, memory card, USB memory, and CD-ROM.

Although a few exemplary embodiments have been shown and described, it will be appreciated by those skilled in the art that changes may be made in these exemplary embodiments without departing from the principles and spirit of exemplary embodiments, the scope of which is defined in the appended claims and their equivalents.

What is claimed is:

1. A display apparatus comprising:
a plurality of receivers which receives a plurality of contents;
a signal processor which generates image frames by processing the plurality of contents;
an output unit which outputs a plurality of content views by combining the image frames of each of the plurality of contents;
a synchronization signal generator which generates a synchronization signal to synchronize a plurality of glass apparatuses matched to the plurality of content views;
an interface unit which transmits the synchronization signal to at least one of the plurality of glass apparatuses;
a controller which, when a depth control command for one of the plurality of content views is input, controls the signal processor to adjust the depth of the one of the plurality of content views; and
a storage unit which stores information related to a depth control state,
wherein, when the depth of the one of the plurality of content views is adjusted and the adjusted one of the plurality of content views is turned on from a turn-off state, the controller reads the information related to the depth control state of the adjusted one of the plurality of content views from the storage unit before the turn-off state and controls the signal processor to output the adjusted one of the plurality of content views according to the information related to the depth control state.

2. The display apparatus of claim 1, wherein, when the display apparatus switches from a single-view mode to a multi-view mode, the controller reads the information related to a depth control state regarding a newly turned on content view from the storage unit and controls the signal processor to output the newly turned on content view according to the information related to the depth control state.

3. A method for controlling a depth, comprising:
receiving a plurality of contents;
generating image frames by processing the plurality of contents;
outputting a plurality of content views by combining the image frames of each of the plurality of contents;
generating a synchronization signal to synchronize a plurality of glass apparatuses matched to the plurality of content views;
transmitting the synchronization signal to the plurality of glass apparatuses;
when a depth control command for one of the plurality of content views is input, adjusting the depth of the one of the plurality of content views;
storing information related to a depth control state; and
when the depth of the one of the plurality of content views is adjusted and the adjusted one of the plurality of content views is turned on from a turn-off state, outputting the adjusted one of the plurality of content views according to the information related to a depth control state stored before the turn-off state.

4. The method of claim 3, further comprising:
when a display apparatus for outputting the content view switches from a single-view mode to a multi-view mode, outputting the newly turned on content view according to the information related to the depth control state of the newly turned on content view.

* * * * *